J. H. BOYD.
Furnaces for Reducing Ores Containing Precious Metals.
No. 144,184.
Patented Nov. 4, 1873.
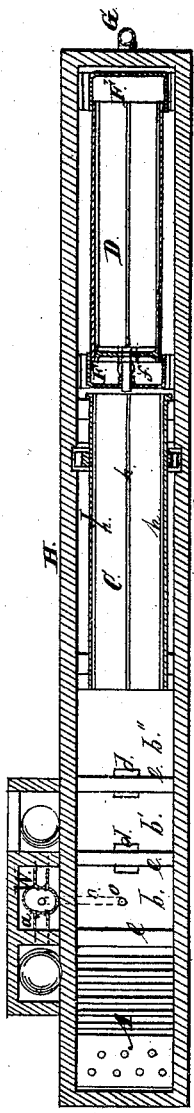
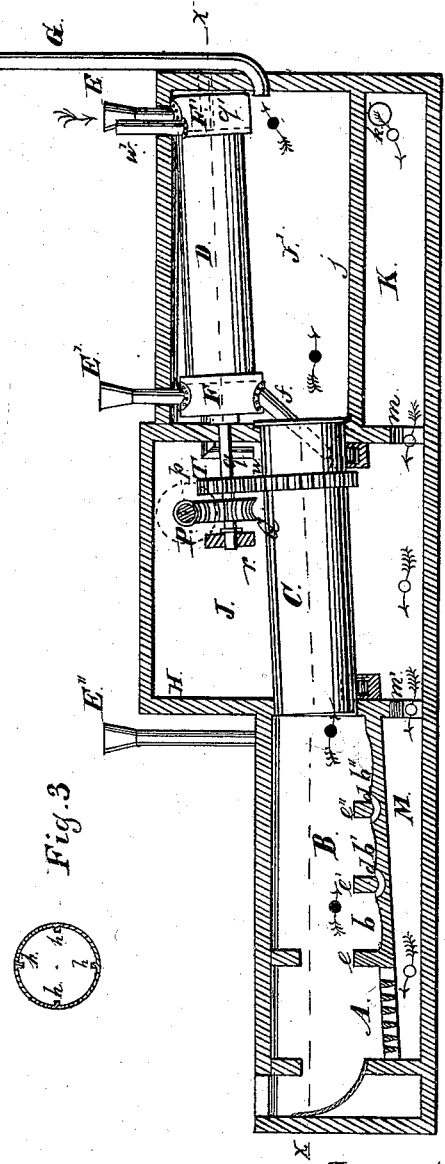
Witnesses:
Heinrich F. Banns
J. S. Rockey.
Inventor:
James H. Boyd
by his atty's
Coburn & Munday

UNITED STATES PATENT OFFICE.

JAMES H. BOYD, OF CHICAGO, ILLINOIS.

IMPROVEMENT IN FURNACES FOR REDUCING ORES CONTAINING PRECIOUS METALS.

Specification forming part of Letters Patent No. 144,184, dated November 4, 1873; application filed October 14, 1873.

CASE A.

*To all whom it may concern:*

Be it known that I, JAMES H. BOYD, of Chicago, in the county of Cook and State of Illinois, have invented certain Improvements in Furnaces for Calcining, Desulphurizing, and Reducing Ores Containing the Precious Metals, of which the following is a specification:

This improved furnace is intended to facilitate the treatment of ores containing gold, silver, and lead, by a continuous process. In the successful working of ores for the gold and silver they contain, it is necessary first to remove as much of the sulphur compounds as possible, as a large portion of the ores contain sulphur in large quantities in the form of sulphide of lead, iron and copper pyrites, &c. The next step is to convert the baser metals associated therewith into oxides; or, should there be no base metals, or not a sufficient quantity, to add them as a flux, either as oxides or in the metal state, to be converted into oxides by roasting. The next step should be to remove the oxygen by some suitable agent, as carbon. The metals are thus left in a metallic state, precipitated in a mass or "mat," leaving the slag or impurities on the surface to be drawn off. If the lead is in excess, the gold and silver will unite with it in the mat; if not, they will unite with the iron and copper or other base metals contained therein, requiring further treatment with excess of lead to separate the gold and silver from the same, leaving the iron and copper and other impurities to be raked or skimmed off, to be treated for the copper it contains; or, if not sufficiently rich in copper, again used as a reducing agent or flux in the working of fresh ores deficient in the baser metals. The enriched lead remaining is either separated from the precious metals by direct cupellation or by the zinc process, or in any suitable manner. Heretofore these different operations have been conducted in separate furnaces, causing great loss of time in handling, and in fuel in reheating for the different operations; and it has been practically impossible to add suitable fluxes at the proper time, and under suitable conditions of the ore, as they were required. In my present invention I obviate the greater part of these difficulties and losses, by building my furnace in several compartments, in each of which a separate part of the operation is carried on; and by feeding my ore in a pulverized state into an inclined revolving cylinder, from whence it descends into the reducing-chamber, I dispense with the necessity of handling the ore or allowing it to cool, while, by thus arranging the several chambers contiguous to each other, I am enabled to operate them all from a single fire, the chamber in which that portion of the working is performed which requires the least heat being located farthest from the fire. And my present invention consists in the furnace hereinafter described, consisting of a revolving inclined cylinder, heated from the outside, provided with internal lifts or wings for agitating the ore, with pipes for admitting air, and with a funnel-pipe for feeding in the pulverized ore at the end farthest from the fire; in conjunction with a similar cylinder, heated by the flame passing through it, into which the ore feeds from the first cylinder; in conjunction with a reducing-hearth placed still nearer the fire, into which the ore passes from the second cylinder; in conjunction with a fire-grate for supplying the necessary heat, all being so located that the heat from the fire will be first made use of nearest the grate for reducing the ore, then in the second cylinder for roasting the ore directly by contact, then in the first cylinder for desulphurizing the ore by heating it from the outside of the cylinder, while it is agitated within in contact with air. And the invention further consists in the mechanism for revolving the said cylinders, and also in the construction and arrangement of the parts of the furnace, whereby the air which supplies the fire is heated by the waste heat of the furnace before it reaches the fire; and it also consists, especially, in the arrangement and combination, with relation to and in connection with the cylinders and reducing-hearth, of the funnels for feeding in fluxes at different stages; and it also consists in dividing the reducing-chamber into several hearths upon different levels, separated by partition-walls or bridges, the hearth into which the ore first passes being the highest and the others successively lower, said hearths being connected one with the other by ducts or passages passing under the division-walls, all in combination with an overflow-pot connected to the lowest hearth, whereby the height of the metal in all the several chambers may be regulated by regulating the height of the bullion in the said overflow-pot, all of which will be more fully hereinafter described.

In the accompanying drawing, which forms a part of this specification, Figure 1 is a vertical longitudinal section of the entire furnace. Fig. 2 is a horizontal section on the line $x$ $x$ of Fig. 1, and Fig. 3 is a transverse section of the cylinders to show the ribs or lifts.

Like letters of reference in the several figures indicate like parts.

In the said drawing, A represents the fire-place and grate of a common kind. B is the reducing-chamber, divided into several hearths, $b$ $b'$ $b''$, of which $b$ is the lowest and nearest the fire, the other two being higher, all being gently inclined, as shown, and separated from each other and from the grate by the bridges $e$ $e'$ $e''$, which rise to an equal height, and each higher hearth being placed in communication with the next lower one by a duct or passage, $d$. The office of these several hearths in the reduction will be explained in course of the description of the operation of the furnace. The lowest hearth, $b$, is connected from its lowest point, by the pipe $o$, with an overflow-pot, W, by means of which the height of the metal in all of the hearths $b$ $b'$ $b''$ may be regulated— that is to say, the metal in the hearths will always stand as high as that in the overflow-pot, and higher if of a less specific gravity. This overflow-pot is fitted with a sliding gate, $a$, which may be removed from its grooves and replaced by another of a greater or less height, whereby the height at which the metal will run off from the pot may be rejected. Adjacent to the reducing-chamber is located the revolving inclined cylinder C, which is made open at both ends, so that the flame from the reducing-chamber may pass directly through it, and come directly in contact with the ore contained therein. This cylinder is placed higher than the bed of the highest of the reducing-hearths, and is inclined so that the end farthest from the fire is the highest, sufficient pitch being given to cause the ore to pass through it gradually by its gravity; and, to insure its passing through, ribs or lifts $h$ are affixed to the inside of the cylinder, which, in the course of the revolution, cause the ore to tumble about, and thus seek the lowest point, and, at the same time, be more fully exposed to the action of the flame. Adjacent to the cylinder C, which I denominate the roasting-cylinder, is placed, in the same line, but higher, the desulphurizing apparatus, consisting of a similar ribbed inclined revolving cylinder, D, which is closed at both ends by the stationary caps F F', so that the flame from the mouth of the cylinder C only touches the outer surface of this cylinder D. The cap F is fitted with a duct or pipe, $f$, leading down into the mouth of the cylinder C, to deliver the contents of said cylinder D thereinto. Of these cylinders, it may be remarked that the cylinder C should be lined interiorly with fire-bricks, and the cylinder D with fire-clay or other suitable material, to resist the action of the sulphurous gases. The walls H of the furnace are so built as to inclose the cylinder C in a chamber, J, and the cylinder D in a chamber, J'. The chamber J' is floored at the bottom of the floor $j$, dividing it from the air-space K, which communicates by the opening $k$ with the open air, so that air to supply the grate is forced to pass in at the opening $k$ through the air-space K; thence, by way of the arch $m$, into the chamber J; thence, by a similar exit-arch, $m'$, into the air-space M, beneath the reducing-hearth. By this means the air, before it reaches the grate, is warmed by the waste heat radiated from the chamber J', the cylinder C, and the several reducing-hearths.

The course of the pure air is indicated by the arrows upon the drawing, marked with an open circle upon the shaft. The course of the subsequent draft of flame and products of combustion is indicated by the arrows marked with a black disk. Said course, it will be observed, is over the reducing-hearths, through the cylinder C, through the chamber J', and out at the exit-flue G.

The mechanism for revolving the cylinders C and D consists of the worm P on the shaft $p$, which shaft extends to the outside of the furnace, and is provided with a driving-pulley, indicated in dotted lines. This worm P actuates the pinion Q upon the shaft $q$, which shaft is attached to and supports the cylinder D by means of the spider $r$. To this shaft $q$ is affixed the cog-wheel T, which is a rim upon the outside of the cylinder C, and attached thereto, whereby the said cylinder C is revolved at a like turning, but in an opposite direction to the cylinder D. The cylinder D is supported upon the shafts $q$ $q'$, while the cylinder C rolls upon itself in bearings at each end, being supplied with friction-rollers $v$ $v$. The interior of the cylinder D is supplied with air by the air-pipe $w$, which takes warm air from the chamber J, the air being discharged from the cylinder by means of the pipe $w'$. The funnels E E' E'' are for feeding in ores, fluxes, and reducing agents. The funnel E enters the stationary cap F', and serves to feed in the pulverized ore. The funnel E' enters the cap F, and communicates, by the duct $f$, with the cylinder C. The funnel E'' communicates with the reducing-hearth $b''$. The two latter are for feeding fluxes and reducing agents at different stages of the treatment.

The detailed operation and working of my improved furnace will be as follows: The ore should be first pulverized to a degree of fineness such as will permit it to pass through a sieve of about forty meshes to the inch, more or less. The pulverized ore is fed into the funnel-pipe E, and enters the cylinder D, where it is heated and agitated in contact with air, but not in contact with the flame. As it passes through this cylinder it gradually approaches a greater heat, and before it escapes into the cylinder C, by way of the pipe $f$, should be completely desulphurized, or at least a great proportion of the sulphur will be eliminated, passing off with the air through the exit $w'$. The metals, in the form of oxides, pass on into the cylinder C, where they are roasted in contact with the flame, being tumbled about and agitated as before. At this point I add, by way of the funnel E', suitable fluxes—as, for instance, if the ore contains sufficient lead, already in the form of an oxide, and sulphate to carry down the gold and silver, I would add carbon or other suitable reducing agent. If too large an amount of silica is contained in the ore, forming silicate of lead, I would add metallic iron to combine with the silica, and set the lead free. If the ore was deficient in or contained no lead, I would add iron in the form of an oxide, or in the metal state, to be converted into oxide at a higher heat, which would again make it necessary to add its reducing agent, which may be carbon, at the funnel E'', opening into the reducing-chamber; otherwise it would be consumed before the iron arrived at a suitable heat for its reduction. Again, if the ore contains too much iron, or more than necessary to carry down the gold and silver, I would add silica to unite with a portion of the iron, forming silicate of iron, which would not precipitate itself with the metals, leaving the gold and silver with the iron, and so on, such fluxes, in short, being added at proper times, as the case demands. As the mass arrives through the lower cylinder it is at a high heat, and easily reduced in the reducing-chamber, the metals and heavier portion of the slag precipitating in their order of gravitation, leaving the light or most liquid portion and best reducing part of the slag on the surface, to be continually acting on the fresh arrivals from the roasting-chambers. The metals and heavier portions in their order pass, by way of the duct $d$ from the hearth $b''$, to the hearth $b'$. In this chamber or hearth $b'$ an opening through the furnace-wall (not shown in the drawing) leads off continually the slag from a point above the precipitated metals. From this hearth $b'$ the metals or the mat flows, by a second duct, $d$, into the hearth $b$. In this hearth lead in the liquid state is retained for the treatment of the mat or precipitated metals by stirring the mass, and bringing the same in contact with the lead, at which the gold and silver will unite with the lead, forming what is termed "lead-bullion," leaving the iron and copper and other substances floating on the surface, to be raked or skimmed off, the bullion to be withdrawn through the pipe or outlet at the bottom connected with the overflow-pot W, so constructed as to retain any depth of lead in the hearth that may be necessary for the treatment of the mat, and subjected to any of the well-known processes for separating the gold and silver from the lead. A condensing apparatus and suction-fan may be applied at the pipe $w'$, if it is desired to condense the vaporized products of the furnace.

Having thus fully described my invention, that which I claim as new, and desire to secure by Letters Patent, is—

1. The combination and arrangement, substantially as shown and described, of the inclined revolving ribbed cylinders C D and reducing-chamber B, constructed and operating in the manner essentially as described.

2. The reducing-chamber B, provided with the hearths $b$ $b'$ $b''$, bridges $e$ $e'$ $e''$, and ducts $d$, substantially as specified.

3. The combination and arrangement of the fire-grate A, reducing-chamber B $b$ $b'$ $b''$, cylinder C, and cylinder D, all inclosed by the furnace-walls, substantially as specified.

4. The combination of the cylinder C, friction-rollers $v$ $v$, cogged rim T, cog-wheel S, shaft $q$, spider $r$, cylinder D, worm P, shaft $p$, and screw Q, substantially as specified.

5. The arrangement and combination of the ingress $k$, air-space K, arches $m$ $m'$, compartment J, air-space M, and grate A, with the reducing-chamber B, cylinders C and D, and compartment J', for the purpose of warming the air to supply the grate, substantially as specified.

6. The combination and arrangement, with relation to the cylinders C D and reducing-chamber B, of the funnel-pipes E E' E'', for feeding in at various points the pulverized ore and fluxes and reducing agents during the operation of the furnace, substantially as specified.

7. The combination of the reducing-chamber B, divided into the hearths $b$ $b'$ $b''$ at different levels, the ducts $d$, conduct or pipe $o$, and overflow-pot W, whereby the height and flow of the metals in the reducing-chamber may be regulated, substantially as specified.

JAMES H. BOYD.

Witnesses:
JOHN W. MUNDAY,
HEINRICH F. BRUNS.